July 26, 1966  R. J. REILLY  3,262,658
CONTROL APPARATUS FOR AIRCRAFT
Filed Feb. 6, 1964  4 Sheets-Sheet 1
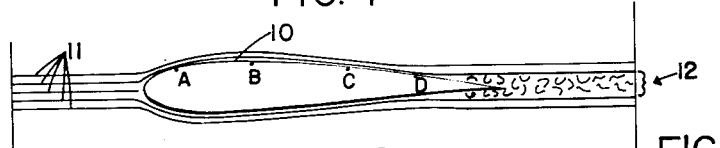
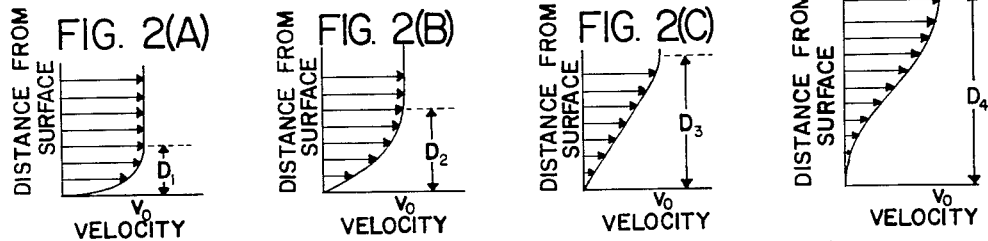
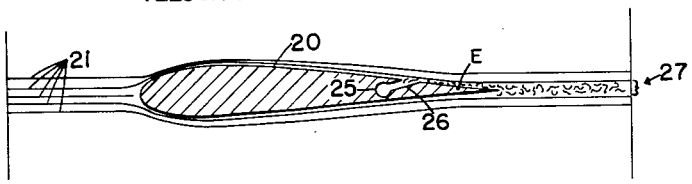
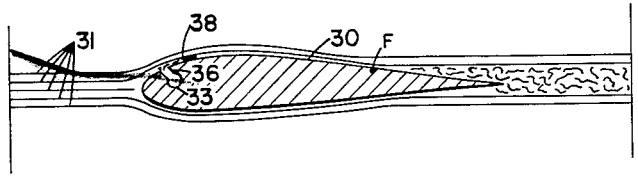
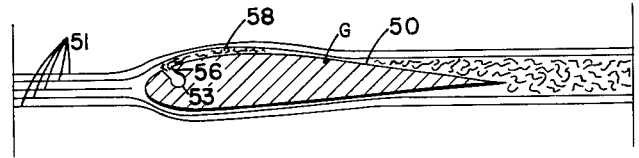
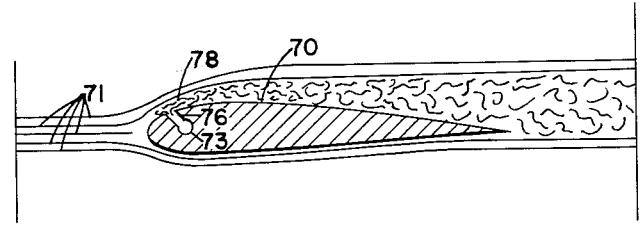
INVENTOR.
RICHARD J. REILLY
BY
ATTORNEY July 26, 1966  R. J. REILLY  3,262,658
CONTROL APPARATUS FOR AIRCRAFT
Filed Feb. 6, 1964  4 Sheets-Sheet 2

INVENTOR.
RICHARD J. REILLY
BY
ATTORNEY

July 26, 1966  R. J. REILLY  3,262,658
CONTROL APPARATUS FOR AIRCRAFT
Filed Feb. 6, 1964  4 Sheets-Sheet 3

INVENTOR.
RICHARD J. REILLY
BY
Roger W. Jensen
ATTORNEY

July 26, 1966  R. J. REILLY  3,262,658
CONTROL APPARATUS FOR AIRCRAFT
Filed Feb. 6, 1964  4 Sheets-Sheet 4

INVENTOR.
RICHARD J. REILLY
BY Roger W. Jensen
ATTORNEY

United States Patent Office 3,262,658
Patented July 26, 1966

3,262,658
CONTROL APPARATUS FOR AIRCRAFT
Richard J. Reilly, St. Paul, Minn., assignor to
Honeywell Inc., a corporation of Delaware
Filed Feb. 6, 1964, Ser. No. 343,088
12 Claims. (Cl. 244—42)

This invention relates to control apparatus for a craft, such as an air or water craft, and more particularly relates to control of such a craft by the injection of fluid in the boundary layer adjacent the craft's surface. For simplicity, the invention will be described as applicable to an aircraft, and more specifically, as applicable to the airfoil surfaces of an aircraft such as the wings, elevators, or fin.

It is known in the prior art that boundary layer injection techniques can be utilized to reduce or minimize the drag which occurs due to turbulence from the rear portion of the airfoil. The present invention, in addition to reducing drag in this manner also operates to control the force normal to the airfoil by a unique boundary layer injection scheme. A patent to I. M. Davidson, No. 3,062,483, issued November 6, 1962, describes apparatus for controlling lift in an airfoil without the use of the standard control devices, such as ailerons, but the Davidson apparatus is directed toward supercirculation in the air flow around the airfoil so that the rear stagnation point can be positioned on various portions of the airfoil trailing edge. A jet flap of sheet of air acts like an aileron to change the lift characteristics of the airfoil. Such a system may be considered a "brute force" control, which requires a fairly large source of compressed air.

The present invention operates to control lift of an airfoil without the use of ailerons, or such other movable control surfaces, and without supercirculation so as to require a much smaller source of compressed air.

One feature of the present invention is the utilization of fluid amplifiers for control of the compressed air in the boundary layer. A frequently undesirable quality of fluid amplifiers is that for operation, a continuous flow of fluid is required and considerable waste results. In the present invention, however, the continuous flow of fluid, when not used for control purposes, is utilized for the purposes of reducing drag and as such, the flow is not considered wasted.

Briefly, the invention provides control by altering the pressures on opposite sides of the airfoil to produce an alteration in the normal force thereon. The pressures are altered by injecting a small flow of fluid from the fluid amplifiers into the boundary layer on the airfoil so that the velocity separation point advances forward on the airfoil, and the pressure distribution changes to alter the force thereon. The port necessary for the fluid injection is preferably located on that portion of the airfoil termed herein as the negative pressure gradient portion, but is not necessarily limited thereto since the velocity separation point may be advanced and the pressure changed when the port is located in the positive pressure gradient portion. The separation point however cannot be moved forward of the port and greater pressure changes are possible with the port located more forward on the airfoil.

A more complete understanding of the present invention will be obtained upon the reading of the following specification, claims, and drawings in which:

FIGURE 1 is the representation of a standard airfoil showing the stream lines therearound;

FIGURE 2 is a series of graphs 2A–2D showing the air velocity in the boundary layer at various points on the upper surface of FIGURE 1;

FIGURE 3 is a showing of the airfoil with air injected to reduce drag;

FIGURE 4 is a showing of the airfoil in which slight air flow is inserted in the leading edge thereof;

FIGURE 5 is a showing of the airfoil in which medium air flow is inserted in the leading edge thereof;

FIGURE 6 is a showing of the airfoil in which large air flow is inserted in the leading edge thereof;

Figure 7:
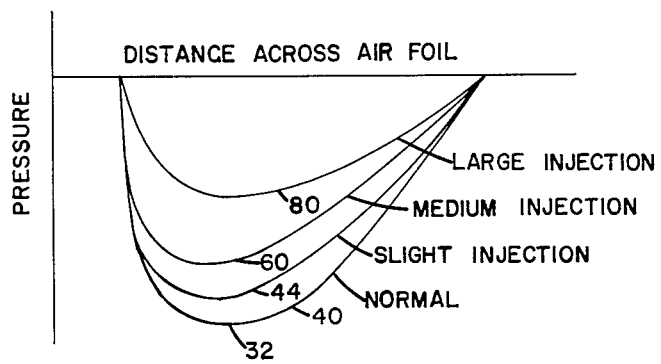
FIGURE 7 is a graph showing the pressure distribution upon the upper surface of the airfoils of FIGURES 1, 4, 5, and 6.

FIGURE 1 shows an airfoil 10 having various streamlines 11 shown thereon. The upper surface of airfoil 10 has four positions marked A, B, C, and D thereon for purposes of explaining FIGURE 2.

FIGURE 2 shows four graphs, each representing the velocity of the air moving in the boundary layer over the airfoil 10 of FIGURE 1 at the various positions A through D.

FIGURE 2A shows the velocity distribution at point A in FIGURE 1. It is observed that at point A, the velocity of air is zero at the surface, but rapidly increases to a velocity $V_0$, which velocity is effectively the local freestream velocity over the wing surface. It is seen that the boundary layer thickness $D_1$, in which this velocity change occurs, is very small at point A. From fluid mechanics it is known that the pressure at point A is less than that at the leading edge of the airfoil and that the pressure decreases to a minium at some point, such as B in FIGURE 1, and thereafter increases toward the trailing edge of the airfoil. Therefore, from the leading edge of the airfoil to point A, a pressure difference exists which aids in moving the air along the surface between these points against the frictional force. From point A to B, a pressure difference exists which likewise assists the flow from point A to point B although the pressure difference is not as great as from the leading edge to point A. From point B to point C in FIGURE 1, there is a pressure increase so that the pressure tends to impede the flow of air in the boundary layer between these points in the same direction as the frictional force, and the boundary layer thickens rapidly. This holds true from points C to point D, and from point D to the trailing edge.

In FIGURE 2B it is seen that the boundary layer $D_2$ is somewhat deeper than the boundary layer $D_1$ of FIGURE 2A, and that the velocity curve is bending more upwardly since the pressure difference aiding the flow is not as great.

In FIGURE 2C, the boundary layer $D_3$ is much thicker than in FIGURE 2B, and the velocity curve is beginning to straighten out in an unstable configuration due to the adverse pressure gradient between points B and C.

In FIGURE 2D it is seen that the boundary layer thickness $D_4$ is now much greater and that reverse flow is about to occur near the surface of the airfoil because the flow can no longer overcome the adverse pressure gradient. The beginning of this reverse flow is called the separation point, and from this point on, vortices of turbulence occur. The velocity distribution along the lower surface of airfoil 10 of FIGURE 1 will change in a similar manner, and a turbulent area, shown in FIGURE 1 by reference numeral 12, occurs. This turbulent area is one of the major factors contributing to drag in an aircraft.

Referring now to FIGURE 3, an airfoil 20 is shown with streamlines 21 thereabout. There is also shown a pressure source 25 operable to inject a small flow of air from a port 26 located near the point of normal separation. A flow of air from the port 26 into the boundary layer will add energy in the boundary layer and delay the separation point so that streamlines adhere to the surface of the airfoil further down toward the trailing edge. In other words, the velocity profile near the previous separation point will be flattened out so that the curve shown in FIGURE 2C for point C will appear more like the curve shown in FIGURE 2B after injection of fluid as in FIGURE 3. As a result, the separation will occur until, for example point E, is near the trailing edge. The turbulent area in FIGURE 3, identified by reference numeral 27, can be seen to be smaller than the turbulent area 12 of FIGURE 1, and this indicates that the pressure drag has been reduced. A port similar to port 26 could be placed on the lower surface of the airfoil 20 to further reduce this area of turbulence.

FIGURE 4 shows an airfoil 30 and various streamlines 31. According to the present invention, a source of air pressure 33 is shown having a port 36 to inject a small stream of air in the forward part of the airfoil. The port is shown in FIGURE 4 close to the leading edge of the airfoil, but this should not be considered limiting since the port may be placed anywhere along the airfoil although preferably in the area of decreasing pressure or negative pressure gradient to obtain the effect to be described. As seen in FIGURE 4, a small stream of air 38 is injected by the pressure source 33 through the port 36. This affects the streamlines 31 in such a manner as to increase the resistance to flow of air along the surface of the airfoil. The consequence of this injection is to move the separation point which occurred at point D in FIGURE 1, and point E in FIGURE 3, further forward on the airfoil to a point such as F. It is seen that injection in this negative pressure gradient portion hastens the boundary layer development of FIGURE 2. It will be seen that a greater area of turbulence now exists which will cause a greater drag on the airfoil. However, the drag occurring at this time is of brief duration and is of little consequence compared with the control effect which is gained. This control effect will be described with reference to FIGURE 7.

In FIGURE 7 a graph is shown displaying the pressure distribution over the upper surfaces of the airfoils of FIGURES 1, 4, 5, and 6. A first curve is shown identified by reference numeral 40 and is indicative of the pressure distribution over the upper surface of the airfoil of FIGURE 1. It is seen that the curve starts decreasing at the leading edge of the airfoil to a minimum at point 32. The portion of the airfoil upon which this portion of the curve exists can be referred to as the negative pressure gradient portion of the airfoil. The minimum may occur at about point B of FIGURE 1. The pressure then begins increasing toward the trailing edge. The portion of the airfoil upon which this portion of the curve between the minimum and trailing edge occurs, that is, where the pressure rises, can be referred to as the positive pressure gradient portion of the airfoil.

Similar curves also exist for the lower surfaces of the airfoils of FIGURES 1, 4, 5, and 6, but these have not been shown in FIGURE 7 for purposes of clarity. An integrated difference in pressure between the upper and lower surfaces of the airfoil causes a force to be exerted on the airfoil which can be used to control the craft.

If the pressure distributions on the upper and lower surfaces are equal there exists a zero force or no lift condition. When air is injected, as shown in FIGURE 4, into the negative pressure gradient part of the airfoil 30, a change in the pressure distribution on the upper surface occurs. This change in pressure distribution can be seen in FIGURE 7 by the curve identified by reference numeral 44. It is seen that the curve 44 decreases in pressure, but to a lesser extent than the normal curve 40. As a consequence, there is, in effect, an integrated increase in pressure on the upper surface of the airfoil 30 of FIGURE 4, over that which occurred on the airfoil 10 of FIGURE 1, and as a result a net downward force exists. If this force occurs on both wings the craft will decrease in altitude and if it occurs on only one wing, the craft will roll. Likewise, if the apparatus is used with the rudder or fin, a yaw turning of the craft will result. Thus, by controlling the pressure distributions on the airfoils the attitude of the craft may be controlled.

In FIGURE 5, an airfoil 50 is shown with streamlines 51 therearound. A source of pressure 53 operating through a port 56, injects a medium size stream of air 58 into the forward portion of the airfoil. It is seen that the streamlines 51 bend further away from the airfoil 50, and in fact, may go back to the airfoil 50 only shortly forward of the separation point now identified with reference letter G. An examination of FIGURE 7 will show that the pressure distribution represented by curve 60, has caused a lesser pressure difference to exist between the upper and lower surfaces of the airfoil, thereby providing a greater downward force.

In FIGURE 6 an airfoil 70 is shown with a streamline 71 therearound. A source of pressure 73 operating through a port 76 is injecting a large flow of air 78 into the forward portion of the airfoil 70. The streamlines 71 now leave the surface of airfoil 70 entirely. In this situation, as can be seen from the pressure distribution curve 80, of FIGURE 7, an even lesser pressure difference exists between the upper and lower surfaces of the airfoil 70, resulting in a greater downward force.

It should be realized that even the large flow of air described with regard to FIGURE 6 is small compared to the flow necessary to accomplish lift changes by supercirculation described in the prior art. This is so, because the present apparatus acts like a fluid amplifier in that a small fluid flow from the port causes changes in the rather large amount of flow over the airfoil. In other words, the present invention takes advantage of a natural amplification process within the boundary layer.

The downward force on the airfoils 30, 50, and 70 of FIGURES 4, 5, and 6, can be used to control the attitude of the aircraft. If it is desired to obtain an upward force or a lift, a pressure source, similar to the pressure source 33 in FIGURE 4, would be used to inject a stream of air into the forward lower surface of airfoil 30. When injected into the lower surface of airfoil 30, the separation point on the lower surface would advance toward the leading edge of the airfoil and an integrated increase in pressure on the lower surface would result, which would in effect produce a lift on the airfoil. It can thus be seen that supplying a small amount of air preferably into that area of the airfoil where there is a negative pressure gradient will cause an increase in pressure on whichever surface of the airfoil the air is injected. If the air is injected into the upper surface, as in FIGURES 4, 5, and 6, then a net downward force or loss of lift results, whereas injecting air into the lower surface would cause an upward force or increase in lift. By properly supplying air to the surfaces, control of the airfoil can be maintained, and the aircraft's attitude may be controlled without moving parts.

It has been found that only a very slight amount of air need be introduced through the port 36 in FIGURE 4 to cause a considerable change in pressure distribution. As mentioned, the airfoil and streamlines of air thereacross, act in conjunction with the pressure source 33 and the port 36 much the same as a fluid amplifier with a small flow of fluid causing changes in a larger flow of fluid. It can thus be seen that only minor amounts of airflow need be utilized to control the craft.

Figure 8:
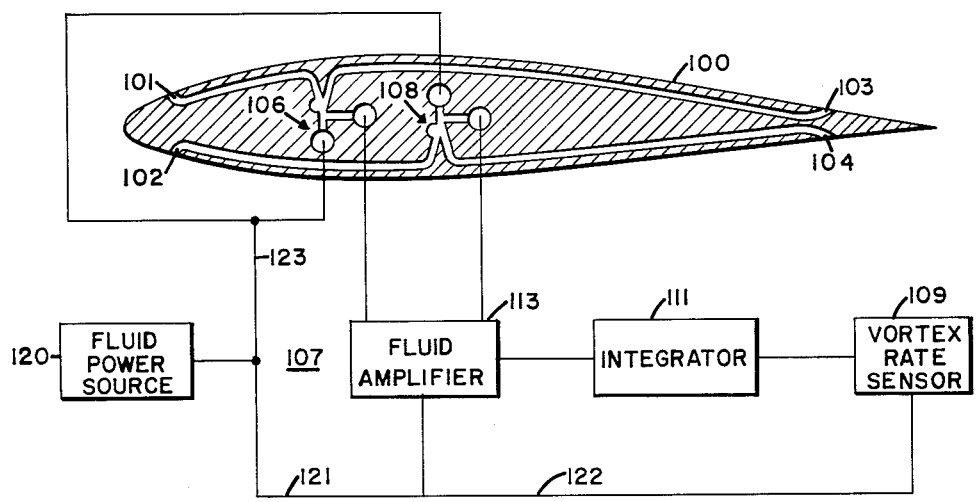
FIGURE 8 is a schematic representation of an embodiment of the present invention.
Figure 9:
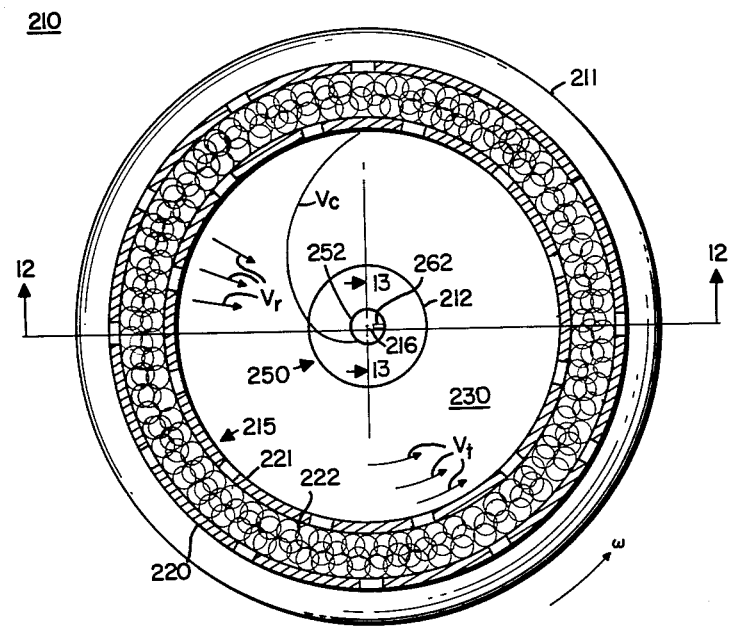
Figure 10:
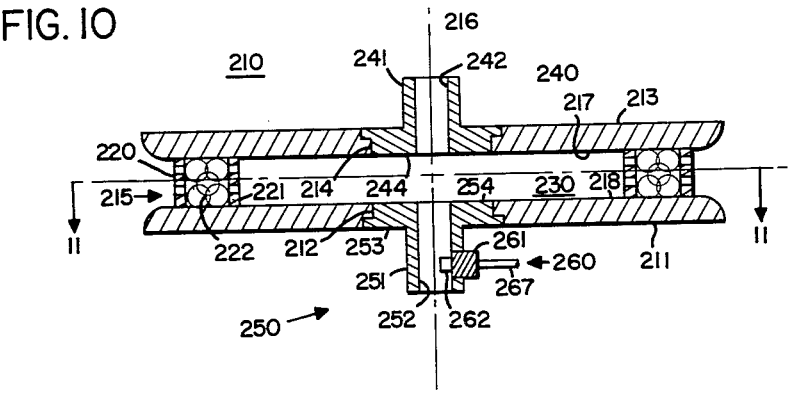
Figure 11:
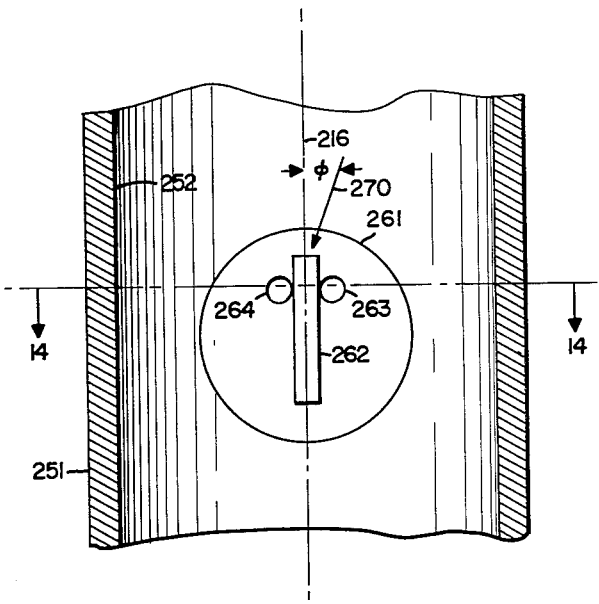
Figure 12:
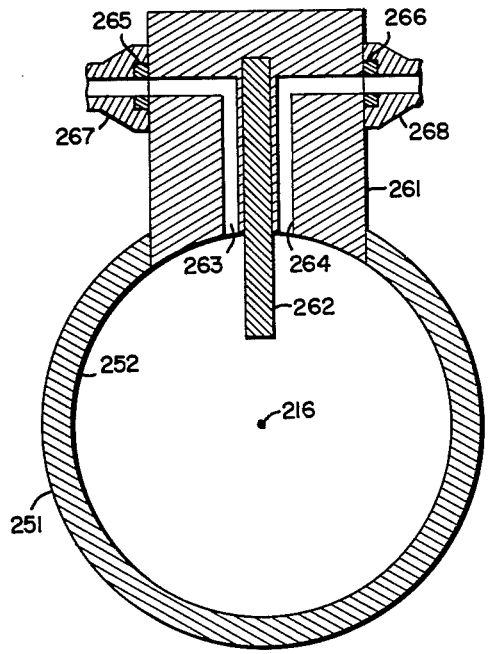

Referring now to FIGURE 8, an airfoil 100 is shown having ports 101 and 102 located forwardly of the airfoil, and ports 103 and 104 located rearwardly on the airfoil. The port 101 is connected to one last stage 106 of a fluid amplifier control system 107, and port 102 is connected to another last stage 108 of the control system 107. The control system 107 includes a rate sensor 109, which senses the aircraft's angular rate about an axis. The rate sensor 109 may be a vortex rate sensor, such as is shown in FIGURES 9 to 12, in which:

FIGURE 9 is a schematic cross sectional view of a vortex rate sensor taken along lines 11—11 of FIGURE 10; and FIGURE 10 is a cross sectional view of a vortex rate sensor taken along lines 12—12 of FIGURE 9; and FIGURE 11 is an enlarged cross sectional view of a fluid flow sensor taken along lines 13—13 of FIGURE 1; and FIGURE 12 is an enlarged cross sectional view of the fluid flow sensor taken along section lines 14—14 of FIGURE 11.

Referring now to FIGURE 9, reference numeral 210 generally depicts a vortex rate sensor. A generally cylindrical plate element 211 is provided having a plane surface 218 thereon. Plate element 211 has a central aperture 212 therein having a circular cross section. Reference to FIGURE 10 indicates a second generally cylindrical plate element identified by reference numeral 213. Plate element 213 has a plane surface 217 thereon and a central aperture 214 therein having a generally circular cross section.

Reference numeral 215 generally depicts a porous ring shaped or annular coupling means. The term porous as utilized in this specification means permeable to fluids. Coupling means 215 comprises a generally cylindrical outer screen member 220 and a generally cylindrical inner screen member 221. It will be noted that inner screen element 221 has a slightly smaller diameter than outer screen element 220. Positioned between inner screen 221 and outer screen 220 are a plurality of glass bells 222 which are very small in diameter, on the order of .015 inch. It is clear that coupling means 215 is porous in nature and allows fluid to pass therethrough with a minimum of restriction. It should be pointed out, that other suitable porous coupling means may be utilized, for example sintered metals, or ceramics.

The cylindrical coupling means 215 is positioned between the plate elements 211 and 213 thereby maintaining plane surfaces 217 and 218 in a spaced parallel relationship. The axis of the cylindrical coupling means 215 is identified by reference numeral 216. Axis 216 is substantially perpendicular to plane surfaces 217 and 218.

Plate elements 211 and 213 in conjunction with coupling means 215 collectively define a vortex chamber 230. The outer periphery of the chamber 230 is defined by the inner screen element 221. The ends of chamber 230 are defined by the plane surface 217 of plate element 213 and the plane surface 218 of plate element 211.

A first exit member 240 is provided. Exit member 240 comprises a tube or fluid conduit 241 having a generally cylindrical bore or passage 242 therethrough. Although a cylindrical passage is shown, passages having other configurations are within the scope of the applicant's invention. Conduit or tube 241 has an external flange or passage portion 243 on one end thereof. The flange portion 243 is positioned within the aperture 214 of plate element 213 such that the bore 242 of exit member 240 is positioned coaxial with axis 216. An end surface 244 of exit member 240 is positioned so as to lie in the same plane as the plane surface 217 of plate element 213. Exit member 240 is rigidly attached to plate 213 by suitable means (not shown) shuch as adhesives or screws.

A second exit member 250 is also provided. Exit member 250 comprises a tube or fluid conduit 251 having a generally cylindrical bore or passage 252 therethrough. Although a cylindrical passage is shown, passages having other configurations are within the scope of the applicant's invention. Conduit or tube 251 has a flange portion 253 on one end thereof. The flange portion 253 is positioned within the aperture 212 of plate element 211 such that the bore 252 of exit member 250 is positioned coaxial with axis 216. An end surface 254 of exit member 250 is positioned so as to lie in the same plane as the plane surface 218 of plate member 211. Exit member 250 is then rigidly attached to plate member 211 by suitable means (not shown) such as adhesives or screws.

A unique fluid flow sensing means 260 is also provided and is illustrated in FIGURE 10 as positioned within exit member 250. Fluid flow sensing means 260 is more clearly illustrated in FIGURES 11 and 12. A blade element having a rectangular cross section is positioned within the bore 252 of exit member 250. The applicant does not wish to be limited to a blade element having a rectangular cross section as illustrated; the blade may take other forms. It will be noted that blade element 262 is positioned within bore 252 substantially parallel to axis 216 of coupling means 215. Two pressure ports 263 and 264 are positioned contiguous blade element 262, one pressure port being located on either side of blade element 262. The pressure ports are positioned generally toward the end of blade 262 nearest chamber 230. Pressure ports 263 and 264 are in communication with bore 252 of exit member 250 at one end and are connected to a differential pressure sensor (not shown) at the opposite end.

In practice, blade element 262 is attached to a mounting means 261 to facilitate positioning with bore 252. Pressure ports 263 and 264 are also contained within the mounting means 261. However, other means may be utilized to locate blade 262 and pressure ports 263 and 264 relative to bore 252; the mounting means 261 constitutes no part of the present invention.

With reference to FIGURE 12, blade element 262 is positioned within a suitable recess in mounting means 261. Pressure ports 263 and 264 are located on either side of blade element 262 within mounting means 261. Pressure ports 263 and 264 are in communication with bore 252 at one end and the opposite ends terminate at output fixtures 265 and 266 respectively. Suitable pressure lines 267 and 268 are connected to the output fixtures 265 and 266 respectively to connect pressure ports 263 and 264 to a suitable differential pressure sensor (not shown).

*Operation*

In operation, a pressure differential exists between coupling means 215 and bores 252 of exit members 240 and 250. Consequently, a fluid flows from coupling means 215, through chamber 230, and out bores 242 and 252. In the absence of any input (angular velocity about axis 216 of the vortex rate sensor), the fluid flow comprises only radial velocity as illustrated by vectors $V_r$ in FIGURE 9 and is described by those skilled in the art as a pure sink flow. It can be shown, that the radial velocity of the fluid at any particular point in the vortex chamber 230 is described by the formula:

$$V_r = \frac{m}{(2\pi\rho)} \frac{1}{r}$$

where $m$ is the mass flow per unit height; $\rho$ is the fluid density and $r$ is the radius from the axis 16 of the point of interest. It is clear from the formula that the radial velocity of the fluid increases as it approaches the sink or bore 252.

When the vortex rate sensor is subjected to an input rate, that is, an angular velocity $\omega$ about the axis 216, the fluid within the coupling means 215 is given a tangential or rotational velocity as illustrated by vectors $V_t$ in FIGURE 9. The tangential or rotation velocity imparted to the fluid is referred to by those skilled in the art as a pure vortex flow. The tangential or rotational velocity of the fluid at any point is as given by the formula:

$$V_t = \frac{\omega r_a}{r}$$

where $\omega$ is the input rate or angular velocity, $r_a$ is the radius of chamber 230 (from axis 216 to the coupling means 215), and $r$ is the radius to the point of interest. It is clear from the above formula that the tangential or rotational velocity increases as the fluid approaches the sink or bore 252. This is explained as an application of the principal of conservation of momentum.

The superimposition of the pure vortex flow upon the pure sink results in a combined vortex-sink flow. The streamline pattern of the fluid, neglecting viscous effects, in the combined vortex-sink flow is a logarithmic spiral as identified in FIGURE 9 by reference symbol $V_c$. The fluid in chamber 230 flows parallel to the plane surface 217 and 218.

As the fluid, flowing in the logarithmic spiral flow pattern, reaches the sink, it flows out through bores 242 and 252. The bores 242 and 252 are coaxial with axis 216 and thus perpendicular to the plane of the fluid flow outside of the sink. Thus, as the fluid flows out of the vortex chamber 230 through bores 242 and 252, it is displaced 90° from its original plane of flow. This results in a fluid flow pattern in the bores 242 and 252 in the form of a helix. That is to say, there is a component of the fluid flow having a longitudinal velocity parallel to axis 216 and a component of the fluid flow having a rotational velocity perpendicular to axis 216. Consequently, the fluid flows through the bores 242 and 252 in a helix pattern; analogous to the flow pattern behind a propellor.

It should be noted that the component of the fluid flow within bore 252 perpendicular to axis 216 is indicative of the input rate $\omega$. The tangential or rotational velocity $V_t$ imparted to the fluid within coupling means 215 appears in bore 252 as the component of fluid flow having a velocity perpendicular to axis 216. As pointed out earlier, the magnitude of the tangential or rotational velocity has been amplified within the vortex rate sensor. Consequently, it is possible to sense the input rate $\omega$, by determining the magnitude of the fluid flow perpendicular to axis 216.

The applicant has provided a unique fluid flow sensor which may be utilized in a vortex gyro to measure the component of the fluid flow having a velocity perpendicular to axis 216 within bore 252, induced by input rate $\omega$. The fluid flow sensor disclosed by the applicant may be utilized in numerous other instruments as hereinbefore indicated, however its operation will be described with reference to the vortex rate sensor.

At the null condition (no input rate), the fluid flow in the vortex is a pure sink flow, that is, there is only radial fluid velocity in the vortex chamber 230. In the bore 252 or sink outlet the fluid flow is longitudinal only, that is, parallel to the axis 216. When the fluid flow is parallel to the axis 216 the pressure on either side of blade element 262 is equal. Therefore, pressure port 263 and pressure port 264 both sense substantially equal pressures. Since the pressure ports 263 and 264 are connected to a differential pressure sensor it is clear that there will be no output signal from the fluid flow sensing means 260 when the flow is parallel to the axis 216.

However, when the vortex rate sensor is subjected to a rate input, the fluid flow through the bore 252 is in the form of a helix. As the flow through the bore 252 follows a helical pattern, the fluid impinges on the blade element 262 as illustrated by arrow 270 in FIGURE 11, at a particular angle $\phi$ defined as the helix angle. The helix angle $\phi$ at which the fluid impinges blade 262 may be determined by the formula:

$$\tan \phi = \frac{\omega r_i 2\pi \rho r_a^2}{mh}$$

where $m$ equals the mass flow per unit heighth, $\omega$ equals the mass density of the fluid, $h$ equals the distance between plates 211 and 213, $\omega$ equals the input rate, $r_a$ equals the radius of coupling means 215, and $r_i$ equals the radius of bore 252. Thus it is seen that the helix angle $\phi$ is a function of the input rate $\omega$.

The pressure of the fluid flowing upstream (towards chamber 230) from plate element 262 is defined as the free stream pressure. As the fluid flow impinges the blade element 262 at a particular helix angle $\phi$, a differential pressure exists across the blade element 262. More specifically, fluid flow impinging the blade element 262 in a direction indicated by arrow 270 in FIGURE 11, results in a positive pressure (relative to the free stream pressure) at pressure port 263 and a negative pressure (relative to the free stream pressure) at pressure port 264. The magnitude of the pressure differential existing between pressure port 263 and 264 is a function of the helix angle $\phi$ at which the fluid impinges the blade element 262. The helix angle $\phi$ at which the fluid flow impinges the blade element 262 is a function of the input rate $\omega$ to the vortex rate sensor and of the strength of the sink flow. Consequently, the pressure differential between pressure ports 263 and 264 is indicative of the input rate to the vortex rate sensor when the sink flow is held at constant strength.

Thus the applicant has provided a unique fluid flow sensor in which the pressure differential existing across a blade element is indicative of a component of fluid flow perpendicular to the blade element. As applied to a vortex rate sensor, the fluid flow sensor produces a signal indicative of the input rate to the vortex rate sensor. If the attitude of the aircraft is to be stabilized, the output of the rate sensor 109 is applied to an integrator 111, which has as its output the integration of attitude rate, which is supplied to a first stage fluid amplifier 113. Fluid amplifier 113 is connected in cascade with amplifiers 106 and 108 for alternately injecting fluid, such as air, either through port 101 or port 102 into the boundary layer so as to cause the separation above described, and thus control the lift on the airfoil. The control system 107 also includes a source of fluid power 120 which may be derived, for example, either by a bleedoff from the turbine or from a pressure probe on the aircraft. Since the flow and pressure of air necessary for the control is small, a pressure probe such as a Pitot tube located on the craft may be used. From the fluid power source 120, fluid passes through conduits 121 and 122 to supply the fluid amplifier 113 and the vortex rate sensor 109. Fluid also flows from the power source 120 through conduit 123 to supply the fluid amplifiers 106 and 108.

When no control signal is supplied by rate sensor 109, the control apparatus 107 is in a quiescent state, and the fluid from the fluid power source 120 to the fluid amplifiers 106 and 108 is caused to flow to ports or slots 103 and 104 for purposes of reducing drag, as explained above. When a control signal is supplied by the rate sensor 109, amplifier 113 operates through fluid amplifiers 106 or 108 to direct some of the flow through the conduit 123 toward the forward ports 101 or 102. If the rate sensor 109 called for a lift signal, the fluid would be caused to flow from the fluid power source 120 through conduit 123 through amplifier 108 to port 102, while if the rate sensor 109 called for a decrease in the lift, fluid power source 120 would supply fluid through conduit 123 and amplifier 106 to port 101. This would be accompanied by a decrease in fluid flow through ports 103 and 104, but as mentioned earlier, the resultant increase in drag will not seriously affect the operation of the craft. Since the airfoils for various craft are quite different, the optimum position for the ports 101, 102, 103, and 104 will have to be determined by experiment.

It will now be apparent that I have provided a novel method and means of producing controlled aerodynamic forces on an airfoil without the use of moving parts by the injection of fluid, such as air, on such a portion of the airfoil surface that the velocity separation point is moved forward and pressure variations on the upper and lower surfaces of the airfoil accomplish increasing and decreasing of the lift. It is also seen that drag reduction is accomplished by injection of air near the rearward portion of the airfoil. While the preferred embodiment has been described as useful on aircraft, it should be realized that any craft having airfoil type surfaces can employ the present invention. As used herein, airfoil is considered generic to the shape of surface, and is not limited to aircraft.

Many modifications will occur to those skilled in the art, and I do not intend to be limited to the disclosures utilized in describing the preferred embodiment.

I claim as my invention:

1. In an aircraft, of the class described comprising,
an airfoil having a surface, the surface having a boundary layer associated with a negative pressure gradient area and a normal velocity separation point; and
a source of fluid;
means responsive to a flight condition of said aircraft and connected both to said source of fluid and to said airfoil so as to cause fluid to flow through ports directed upstream of said surface into the boundary layer toward the front of the airfoil in the negative pressure gradient area to induce turbulence to move the velocity separation point forward and to alter the pressure on the surface generally perpendicular to the area.

2. Apparatus of the class described comprising,
an airfoil having first and second surfaces, each surface having a boundary layer and having a negative pressure gradient portion;
a fluid amplifier means having an adaptive means to be connected to a source of fluid;
said fluid amplifier means being connected to said airfoil so as to cause fluid to flow through ports directed upstream of said surface into the boundary layers on the negative pressure gradient portions of the surfaces to alter the pressure on and thus lift the surfaces.

3. Apparatus of the class described comprising,
an airfoil having first and second surfaces, each surface having a boundary layer and a normal velocity separation point;
a fluid amplifier means having an adaptive means to be connected to a source of fluid;
said fluid amplifier means being connected to said airfoil so as to cause fluid to flow into the boundary layers of said surfaces to move the velocity separation point forward to alter the net lateral pressures on and thus lift the surfaces, and to cause fluid to flow through ports directed tangentially downstream of said surface into the boundary layers on the positive pressure gradient portions of said surfaces to reduce the drag on said airfoil.

4. Apparatus of the class described comprising,
an airfoil having a surface, the surface having a boundary layer and having positive and negative pressure gradient portions;
a fluid amplifier, said amplifier being adaptive to be connected to a source of fluid, said amplifier having first and second output conduits;
a first passage means connecting the first output conduit of said amplifier to said airfoil to produce a flow of fluid into the boundary layer in the negative pressure gradient portion of the surface to alter the net pressure on the surface generally perpendicular thereto;
and second passage means connecting the second output conduit of said amplifier to said airfoil to produce a flow of fluid through ports directed tangentially downstream of said surface into the boundary layer in the positive pressure gradient portion of the surface to reduce the boundary layer thickness and thus reduce the drag on said airfoil.

5. Apparatus of the class described comprising,
an airfoil having first and second surfaces, each surface having a boundary layer and having a normal velocity separation point;
a source of fluid in combination therewith;
a first fluid amplifier connected to the source of fluid and having first and second output conduits;
a second fluid amplifier connected to the source of fluid and having first and second output conduits;
fluid passage means connecting the first output conduits of said first and said second fluid amplifiers to said airfoil to produce a flow of fluid into the boundary layers of the first and second surfaces respectively to move the separation point forward and alter the lateral pressures on the first and second surfaces;
and second fluid passage means connecting the second output conduits of said first and said second fluid amplifiers to said airfoil to produce a flow of fluid through ports directed tangentially downstream of said surface into the boundary layers of the first and second surfaces to reduce the thickness of the boundary layers respectively to reduce the drag on said airfoil.

6. In an airfoil having a surface exposed to fluid flow thereby producing an aerodynamic force at an angle to the direction of fluid flow, said surface having a negative and a positive pressure gradient portion, said airfoil comprising:
a first passage communicating with the surface in the positive pressure gradient portion thereof and a second passage communicating with the surface in the negative pressure gradient portions thereof, the opposite ends of said passages having a junction, a source of fluid under pressure being connected to said junction and normally directing fluid flow toward one of said passages, and fluid amplifier means for controlling the fluid flow for reducing the initial flow through one passage and increasing the fluid flow through the other passage.

7. In an aircraft having an airfoil surface with a first discharge aperture therein adjacent its front edge and a second discharge aperture therein rearward the first aperture,
means for normally supplying pressurized air to the second aperture, and fluid sensing means responsive to a flight condition including vortex rate sensing means of the aircraft decreasing the flow through the second aperture and increasing the flow through the first aperture to cause controlled separation of the boundary layer adjacent the first aperture to decrease the lift of the airfoil.

8. In an aircraft having two wing surfaces on opposite sides of the fore and aft center line of said craft, each wing surface having a corresponding positive and a corresponding negative pressure gradient portion and a first discharge means in the negative pressure gradient portion thereof and a second discharge means directed tangentially downstream of said surface in the positive pressure gradient portion thereof,
means normally supplying pressure air to the second discharge means of both wing surfaces, means responsive to a flight condition of the aircraft, and means controlled by the flight condition responsive means relatively varying the respective flows through the first discharge means of said wing surfaces to control the attitude of the craft about the center line.

9. In an aircraft, control apparatus producing controlled aerodynamic forces on an airfoil thereof without the use of moving parts such as ailerons, elevators, rudders, etc. comprising:
first means for relatively varying the amount of ejected air passing through ports in the area of negative pressure gradient of said airfoil, and vortex rate sensing means responsive to a flight condition of the aircraft controlling the first means for effecting such relative variation, thereby varying the pressure distribution over such airfoil, the resulting aerodynamic force causing a change in attitude of said aircraft.

10. In a surface exposed to fluid flow such as an airfoil or hydrofoil surface and having opposed sides relative to a plane of symmetry merging at the leading and trailing ends as related to the direction of the fluid flow, said surface having a first pair of discharge slots directed tangentially downstream of the surface in the positive pressure gradient portion of the surface and normally having fluid ejected through ports therethrough into an area of the boundary layer on each side of the surface for decreasing the drag thereof, said surface having a second pair of discharge slots directed toward the airfoil leading edge in the negative pressure gradient portion of the surface for ejecting fluid into the boundary on each side for disturbing the boundary layer flow, to produce a change of pressure distribution and means for reducing flow through one of the first pair of discharge slots and increasing the flow through one of the second pair of discharge slots to thereby control fluid dynamic forces on said surface.

11. Control apparatus for a surface exposed to fluid flow such as an airfoil or hydrofoil surface and having opposed sides thereof relative to a plane of symmetry merging at the leading and trailing ends as involving the relative direction of fluid flow, the sides of said surface being contoured as to have a negative and a positive pressure gradient portions from leading to trailing end during the flow of said fluid, said surface having a first pair of discharge slots directed tangentially downstream of the surface in the positive gradient portion and normally having fluid ejected therethrough into the boundary layer on each side for decreasing the drag thereof, said surface having a second pair of discharge slots in the negative gradient portion for ejecting fluid into the boundary layer on each side for disturbing the boundary layer flow, and fluid amplifiers means for selectively reducing flow through one of the first pair of slots while increasing flow through one of the second pair of slots.

12. Apparatus for use with a craft having an airfoil with first and second surfaces and each surface having a negative pressure gradient portion and a positive pressure gradient portion, in combination:
and including a source of fluid;
first and second fluid amplifiers connected to the source of fluid and each having first and second outputs;
sensing means sensing displacement of the craft from a predetermined attitude and providing an output signal in accordance therewith;
means connecting said sensing means to said fluid amplifiers to proportion the outputs therefrom in accordance with the output signal;
first conduit means connected to said first and second fluid amplifiers and to said airfoil to provide a fluid flow from the first of the outputs of each fluid amplifier into the positive pressure gradient portions of the first and second surfaces respectively to reduce drag;
second conduit means connected to said first and second fluid amplifiers and to said airfoil to provide a fluid flow from the second of the outputs of each fluid amplifier into the negative pressure gradient portions of the first and second surfaces respectively to alter the pressures about the first and second surfaces to position the craft in the predetermined attitude.

References Cited by the Examiner

UNITED STATES PATENTS

| | | | |
|---|---|---|---|
| 2,049,573 | 8/1936 | Stalker | 244—42 |
| 2,210,917 | 8/1940 | Kenyon et al. | 244—78 |
| 2,297,412 | 9/1942 | Hoppe | 244—78 X |
| 2,420,932 | 5/1947 | Cornelius | 244—78 |
| 2,873,931 | 2/1959 | Fleischmann | 244—42 |
| 2,886,264 | 5/1959 | Seager | 244—42 |
| 2,896,881 | 7/1959 | Attinello | 244—42 |
| 3,079,758 | 3/1963 | Vogel et al. | 244—78 X |
| 3,122,165 | 2/1964 | Horton | 244—78 X |
| 3,124,322 | 3/1964 | Cockerell | 244—42 X |

FOREIGN PATENTS 937,046   9/1963   Great Britain.

MILTON BUCHLER, *Primary Examiner.*

B. BELKIN, *Assistant Examiner.*